US011998916B2

United States Patent
Hajek-Herrera et al.

(10) Patent No.: US 11,998,916 B2
(45) Date of Patent: Jun. 4, 2024

(54) DUAL BALANCE ELECTRODYNAMIC TRAP WITH ENHANCED SAFETY AND MODULARITY

(71) Applicant: Microlev LLC, Burbank, CA (US)

(72) Inventors: Josefina Hajek-Herrera, Eugene, OR (US); David Woolley, Austin, TX (US); Ryan Davis, Albuquerque, NM (US)

(73) Assignee: Microlev LLC, Burbank, CA (US)

( * ) Notice: Subject to any disclaimer, the term of this patent is extended or adjusted under 35 U.S.C. 154(b) by 0 days.

(21) Appl. No.: 18/136,829

(22) Filed: Apr. 19, 2023

(65) Prior Publication Data

US 2023/0330676 A1 Oct. 19, 2023

Related U.S. Application Data

(60) Provisional application No. 63/332,685, filed on Apr. 19, 2022.

(51) Int. Cl.
*B01L 3/00* (2006.01)

(52) U.S. Cl.
CPC ......... *B01L 3/502784* (2013.01); *B01L 3/561* (2013.01); *B01L 2200/0626* (2013.01); *B01L 2400/0415* (2013.01)

(58) Field of Classification Search
CPC .............. B01L 3/502784; B01L 3/561; B01L 2200/0626; B01L 2400/0415
USPC .................................................. 422/547, 500
See application file for complete search history.

(56) References Cited

PUBLICATIONS

Richards, Anal.Chem.2020,92,3086-3094 (Year: 2020).*
Davies , J.; Aerosol Sci. Technol., 2019,53,309. (Year: 2019).*
Jacobs, M.I.; Davies, J.F.; Lee,L.; Davis, R.D.; Houle, F.; Wilson, K.R., Anal.Chem., 2017,89, 12511-12519 (Year: 2017).*
Hart, M.; Sivaprakasam, V.; Eversole,J.; Johnson, L.; Czege,J. Appl.Opt.2015,54,F174. (Year: 2015).*

\* cited by examiner

*Primary Examiner* — Christine T Mui
(74) *Attorney, Agent, or Firm* — Outlier Patent Attorneys, PLLC

(57) ABSTRACT

A dual balance electrode trap having an outer chamber, a droplet dispenser holder removably coupled to the top surface of the outer chamber, and a rod holder having a central opening and four peripheral openings that are sized and shaped to allow four respective quadrupole metal rods to pass therethrough. The droplet dispenser holder has a top surface, a bottom surface, and a through hole that extends from the dispenser holder top surface to the droplet dispenser bottom surface. The through hole has a larger diameter portion adjacent to the top surface and a smaller diameter portion adjacent to the bottom surface, thereby preventing a droplet dispenser distal tip from extending entirely through the hole and contacting electrodes in the DBET. The rod holder is configured to be removably coupled to the quadrupole metal rods so that a location of the rod holder relative to the metal rods is adjustable.

20 Claims, 5 Drawing Sheets

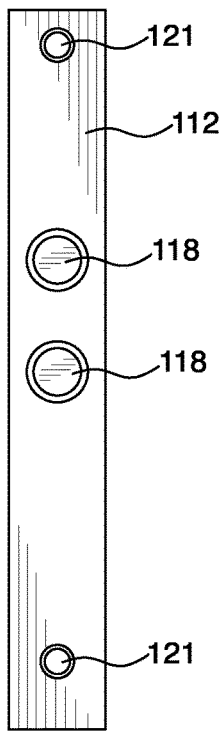 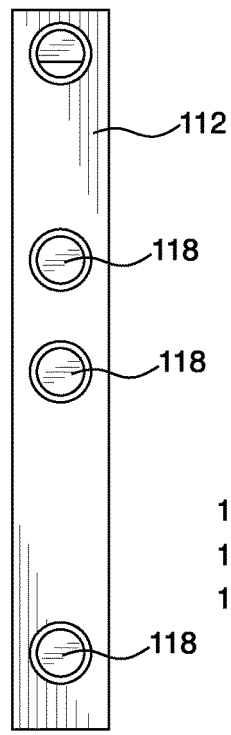 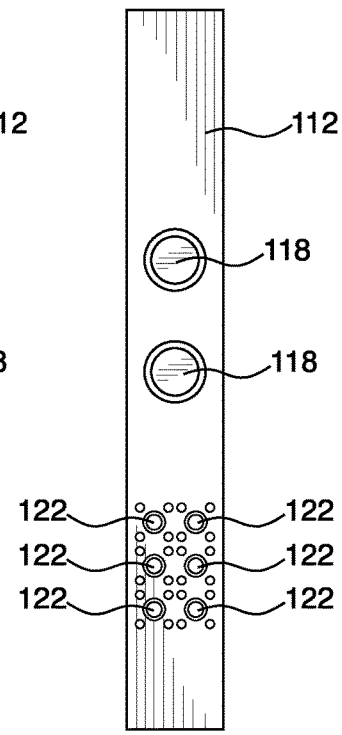 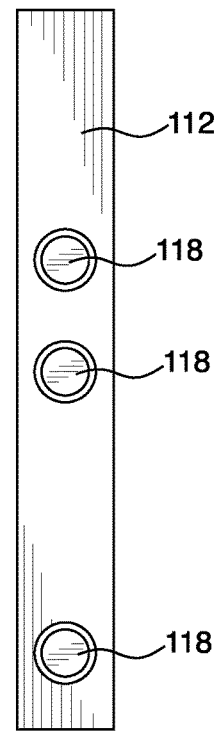
FIG. 3A        FIG. 3B        FIG. 3C        FIG. 3D
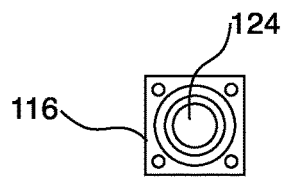                       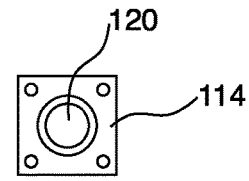
FIG. 3E                                     FIG. 3F

DUAL BALANCE ELECTRODYNAMIC TRAP WITH ENHANCED SAFETY AND MODULARITY

CROSS-REFERENCE TO RELATED APPLICATIONS

This Application claims priority to U.S. Provisional Patent Application No. 63/332,685 filed on Apr. 19, 2022, entitled "Analytical Devices for Controlled Levitation of Droplets," the contents of which are hereby incorporated herein by reference.

BACKGROUND

Field of the Art

This disclosure relates generally to analytical devices. More specifically, the present invention is concerned with devices for controlled levitation of droplets.

Discussion of the State of the Art

Electrodynamic droplet levitation is a technique in atmospheric or particle chemistry for studying the properties of a single droplet without any interaction from supporting surfaces or other particles. To study the physical and optical properties of aerosol particles, a linear quadrupole electrodynamic balance can be used to levitate single aerosol particles using electric fields. This method allows for contactless probing of particle properties in controlled conditions.

The linear quadrupole electrodynamic balance 10, an example of which is shown in FIG. 1, includes four metal rods 12 arranged parallel to each other in a square pattern. An induction electrode charges a droplet as it exits a droplet dispenser at the top of the device, and the charged droplet is suspended along a central longitudinal axis in the middle of the four metal rods 12.

Current methods of droplet levitation can expose users to high voltages that are potentially lethal. These methods are thus dangerous for inexperienced users and can also cause damage to electrical equipment. Alternatively, non-electrostatic methods of levitation utilize high-powered laser beams, which can be dangerous to inexperienced users because of the damaging effects of laser exposure to users' eyes.

Many methods of droplet levitation are also not modifiable and have a fixed configuration that limits their broad applicability. Without modifiability, users have high-cost, single-use equipment that limits the range of potential configurations.

Previous designs of droplet electrodynamic traps have not successfully contained the high voltage electrode within the whole device. This fails to protect the user from exposure, creating potential risks and liability. Previous designs can also levitate single droplets in a controlled environment chamber for real time data analysis. However, they pose potential risks due to exposed electrodes while generating droplets.

There is a need for an electrodynamic trap that avoids the potential of exposing the user to high voltages and that includes some adjustability so that users can adjust the apparatus to fit their needs.

SUMMARY

The Dual Balance Electrodynamic Trap (DBET) of the present invention includes a droplet dispenser holder that is configured to maintain a safe distance between the droplet dispenser and the electrodes inside the DBET. The DBET further includes a chamber to which the droplet dispenser holder is coupled. Still further, the DBET includes one or more rod holders that are removably coupled to the rods inside the chamber. The rod holders are thus configured to hold the rods in their desired position while also having an adjustable position along the length of the rods.

The dispenser holder is configured to hold a droplet dispenser, which permits the generation of electrostatically charged droplets without potentially exposing the user to a high voltage electrode. The holder does this by maintaining a proper distance between the droplet dispenser and an electrode, thus preventing the dispenser from making contact with any electrodes. This protects users and equipment from being exposed to dangerous levels of high voltage.

The droplet dispenser allows a user to generate charged droplets that can be levitated, but prevents the user from being exposed to the high voltage necessary to charge droplets for levitation. This is done by having a physical barrier that prevents a droplet dispenser from moving past a certain distance, but has an opening wide enough that allows droplets to pass through to the electrode.

The rod holders properly position quadrupole rods within the DBET, and also serve as counterbalance electrode holders and can be used to make electrical connections. The rod holder can be positioned at any point along a quadrupole, allowing the DBET to be modifiable.

The DBET cell is a chamber in which droplets and particles can be levitated in an air-tight environment. Two ports allow for the introduction of a gaseous flow, and six smaller ports allow for a high voltage feed through for powering the other parts. In addition, window ports allow the droplet to be seen at different points along the quadrupole.

The DBET chamber houses all of the high voltage connections, and protects the user from exposure. There are high voltage feedthrough ports that deliver the necessary voltages and allow levitation to occur, but the user has no risk of inadvertently being exposed to unsafe voltages.

Another advantage of the current apparatus is that it can be modified in ways that are not possible with conventional apparatuses. The DBET rod holders enable the location of parts (e.g., the rod holders and the counter balance electrodes associated therewith) within the DBET to be manipulated. Modifiability allows the user to change the configuration of the device for ease of use, including the addition of extra levitation stages, changing electrical connections within the device, or changing the location of levitation to facilitate different methods of study. In other words, the user can customize the DBET configuration to their needs. This customizability is enabled by a rod holder design that has a lip to grip the quadrupole rods, a set screw that tightens a rod holder in place, and holes for different wiring configurations.

Additionally, it allows for the flexibility of the positioning of levitated droplets within the chamber. The DBET chamber is designed to have a wide region where different components can be positioned by sliding parts along the length of the chamber. The bore diameter of the chamber is the same as the diameter of the rod holders.

The DBET dispenser holder overcomes the risk of electric shock by covering the exposed electrode, therefore avoiding risk of user exposure, but still has an opening that allows for a droplet to pass through to the electrode. This allows the entire device to be used for levitation of droplets, but does so safely. For example, the dispenser holder does not need to be removed in order to position or change the droplet dispenser, and the electrode is not exposed at any point during operation. This is achieved by a physical barrier that prevents the droplet dispenser from being inserted too far where it would make contact with the electrode, which would be dangerous for the user and damaging to equipment. There is, however, an opening that is wide enough for a droplet to pass through to the electrode. This opening is too narrow for a human finger to pass. A set screw prevents the droplet dispenser from falling out of position.

In one example, an apparatus for use in a dual balance electrode trap includes an outer chamber having a top surface, a bottom surface, at least one sidewall surface extending between the top surface and the bottom surface, at least one optical port in the sidewall surface, and a plurality of electrical feedthrough ports in the sidewall surface. The outer chamber may include four sidewall surfaces, each one of the sidewall surfaces having an optical port. The sidewall surface of the outer chamber may include two gas flow ports that are smaller than the optical port. The optical port may include a transparent, airtight window for allowing a levitating droplet to be viewed from outside of the outer chamber.

The apparatus further includes a droplet dispenser holder removably coupled to the top surface of the outer chamber. The droplet dispenser holder has a top surface, a bottom surface, and a through hole that extends from the dispenser holder top surface to the droplet dispenser bottom surface. The through hole has a larger diameter portion adjacent to the droplet dispenser holder top surface and a smaller diameter portion adjacent to the droplet dispenser holder bottom surface. The droplet dispenser holder may further include a threaded opening in communication with the larger diameter portion of the through hole. The threaded opening is sized and shaped to allow a set screw to pass therethrough in order to hold a distal end of a droplet dispenser in place relative to the droplet dispenser holder. The droplet dispenser holder may be made of a non-conducting material.

Still further, the apparatus includes a rod holder having a central opening and four peripheral openings that are sized and shaped to allow four respective quadrupole metal rods to pass therethrough. The rod holder is configured to be removably coupled to the quadrupole metal rods so that a location of the rod holder relative to the metal rods is adjustable. The rod holder may further include four threaded openings, each one of the four threaded openings being in communication with a respective one of the four peripheral openings. The four threaded openings may be sized and shaped to allow a set screw to pass therethrough in order to hold the four respective quadrupole rods in place relative to the rod holder. The rod holder may be made of a non-conducting material. The apparatus may include a plurality of rod holders configured to be removably coupled to the quadrupole metal rods at a respective plurality of locations along a length of the quadrupole metal rods.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIGS. 3A-3D are plan views of the four sidewalls of the outer chamber of the DBET, in accordance with an embodiment of the present invention.

FIGS. 3E and 3F are top and bottom plan views, respectively, of the outer chamber of the DBET, in accordance with an embodiment of the present invention.

DETAILED DESCRIPTION

Figure 1:
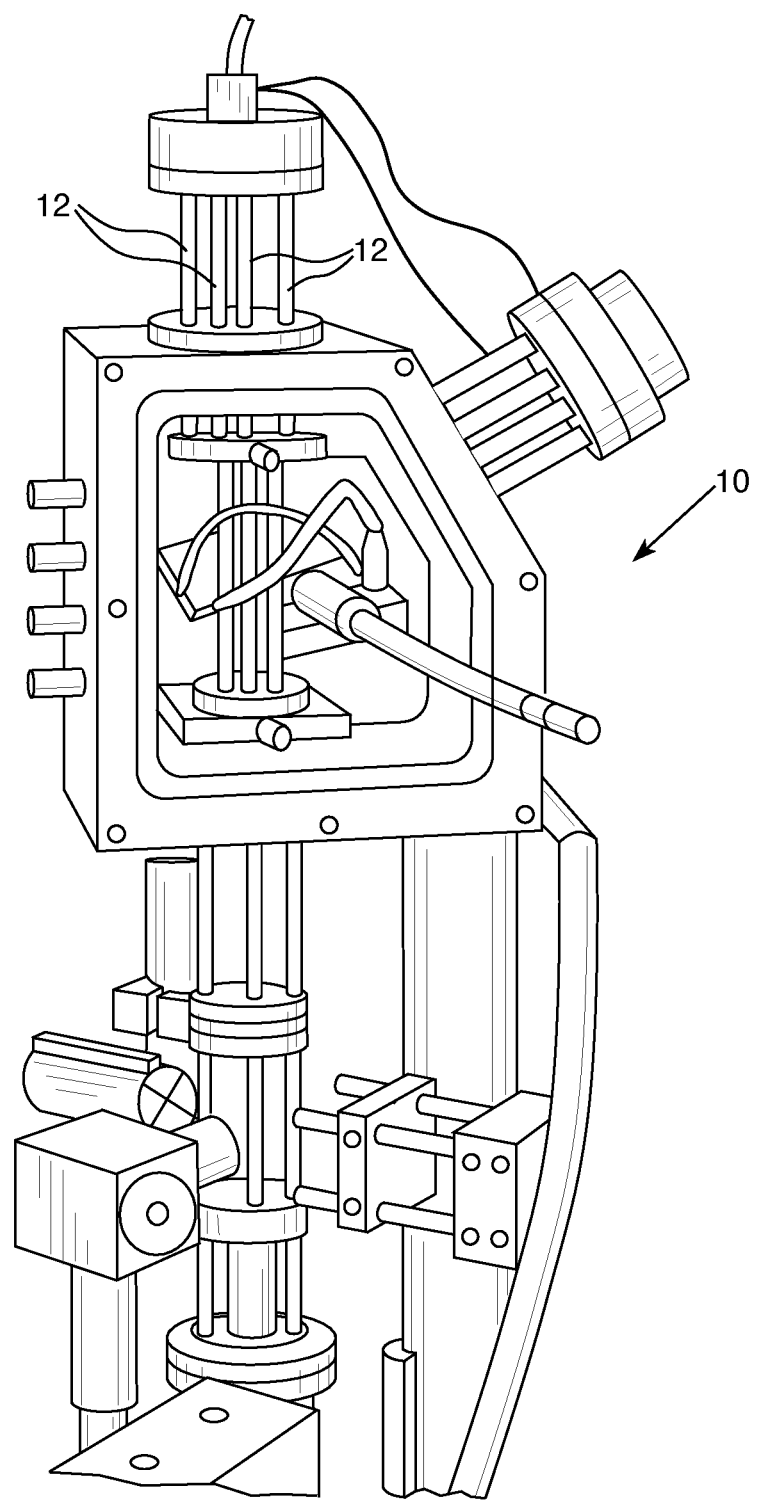
FIG. 1 shows a conventional linear quadrupole electrodynamic balance.

The present invention is a dual balance electrode trap (DBET) that includes one or more of the following, in accordance with an embodiment of the invention: rod holders, a chamber, and a droplet dispenser holder. Other components may include set screws, screws, metal plate electrodes, metal rods for a quadrupole, electrical wires, electrical connectors, gas tube fittings, optical windows, o-rings, and/or a droplet dispenser. The DBET in accordance with the present invention protects the user from exposure to high voltages and allows for some adjustability that is not present in the prior art.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention comprises a dual balance electrodynamic trap (DBET) that includes a droplet dispenser holder, a chamber, and a rod holder. The droplet dispenser holder is configured to prevent the user from being exposed to the high voltage electrodes. The chamber is configured for housing the components in a safe manner. The rod holder is configured to hold the rods in place and provide desired adjustability.

Apparatus

Figure 2:
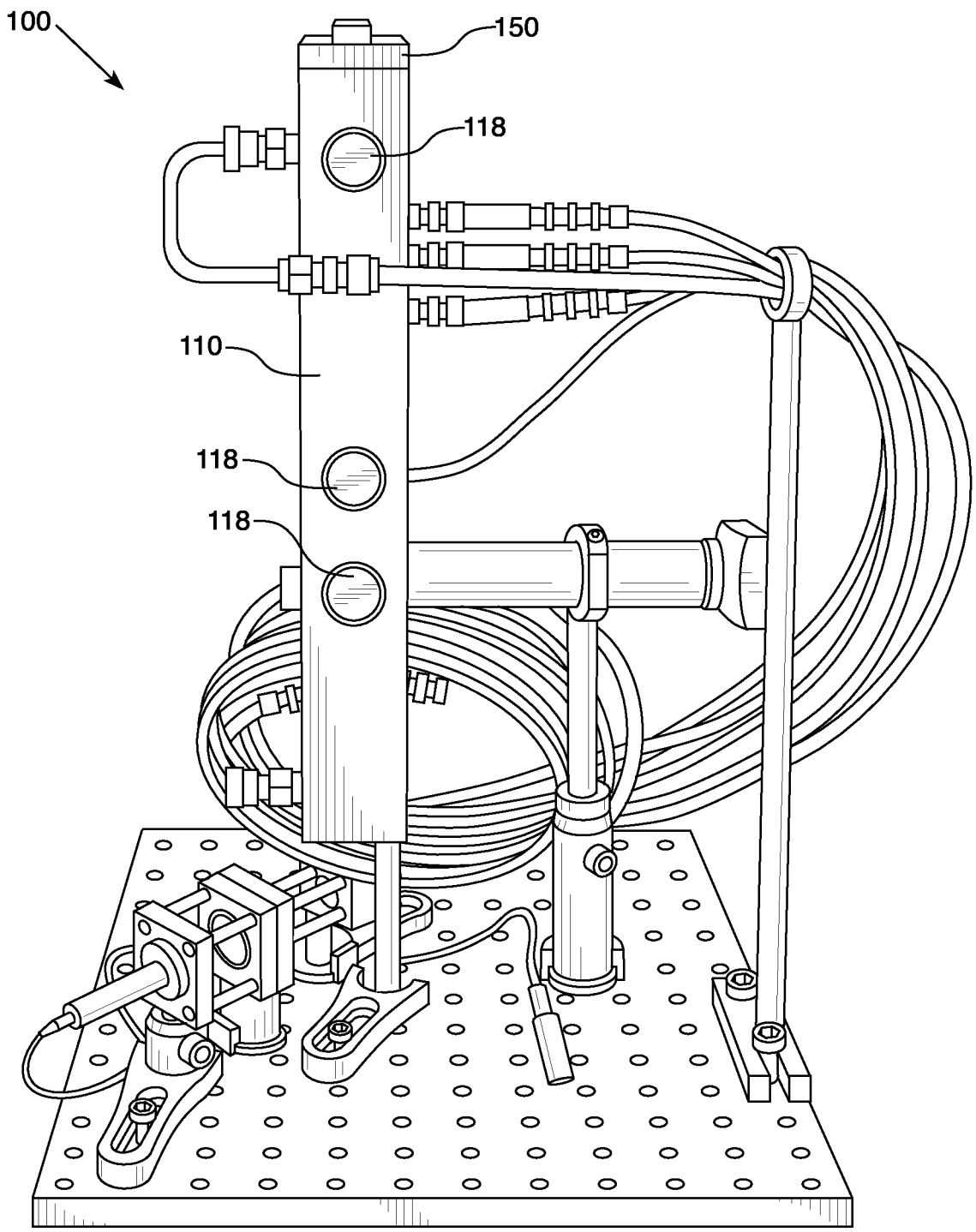
FIG. 2 is a front view of a dual balance electrode trap (DBET), in accordance with an embodiment of the present invention.

A DBET 100 in accordance with the present invention is depicted in FIG. 2. The DBET 100 includes a chamber 110 for housing components of the DBET 100 and a droplet dispenser holder 150 coupled to the top of the chamber 110. Metal rods disposed within the chamber 110 are held in place with one or more rod holders (not shown) that are also disposed within the chamber 110. As such, all of the electrodes and metal rods are completely enclosed within the chamber 110 in order to protect the user from being exposed to high voltages during operation of the device 100.

The chamber 110 includes a plurality of optical ports 118 for viewing and/or interrogating levitated droplets. The chamber 110 shown in FIG. 2 has a square cross-section and one of the sidewall surfaces of the chamber 110 can be seen in FIG. 2. However, it will be readily apparent to one of ordinary skill in the art that the chamber may have other shapes and may have any desired number of optical ports. For example, the chamber 110 may be cylindrical.

The chamber 110 will be discussed in more detail with reference to FIGS. 3A-3F. The chamber 110 is configured to contain the quadrupole and all other electrical components necessary for droplet levitation. The chamber 110 includes four sidewall surfaces 112, a bottom surface 114, and a top surface 116. Each one of the sidewall surfaces 112 includes one or more optical ports 118 for interrogating and/or viewing levitated droplets. A window port 120 on the bottom surface 114 is available for introducing a probe laser from the bottom of the chamber 110. Windows in the optical ports 118 may be held in place by a threaded retaining ring or other similar retaining mechanism. The windows in the optical ports 118 are airtight and transparent. The chamber 110 further includes two gas ports 121 for the inlet and outlet of a gas flow. The gas ports 121 are smaller than the optical ports 118. Smaller ports 122 in one of the sidewall surfaces 112 may be used for electrical feedthroughs using flange mount connectors, which are held in place by screws. The top surface 116 of the chamber 110 includes an induction plate (not shown), which is covered by the dispenser holder 150. The top surface 116 further includes an opening 124 for allowing a droplet to pass therethrough and into the chamber 110.

The levitation chamber 110 is configured for housing high voltage components and controlling environmental parameters. The levitation cell is a chamber 110 in which droplets and particles can be levitated in an air-tight environment. The chamber 110 may alternatively be cylindrical, or any prism that is sufficient to create a closed chamber, and the bottom 114 of the chamber 110 may remain open. The number and location of window ports 118, the number and location of electrical inputs, the width of the chamber, the overall size and length of the chamber, and the size of the threaded holes may be changed, depending on the needs of the user. Window ports may include a retaining plate to hold windows in place.

Figure 4A:
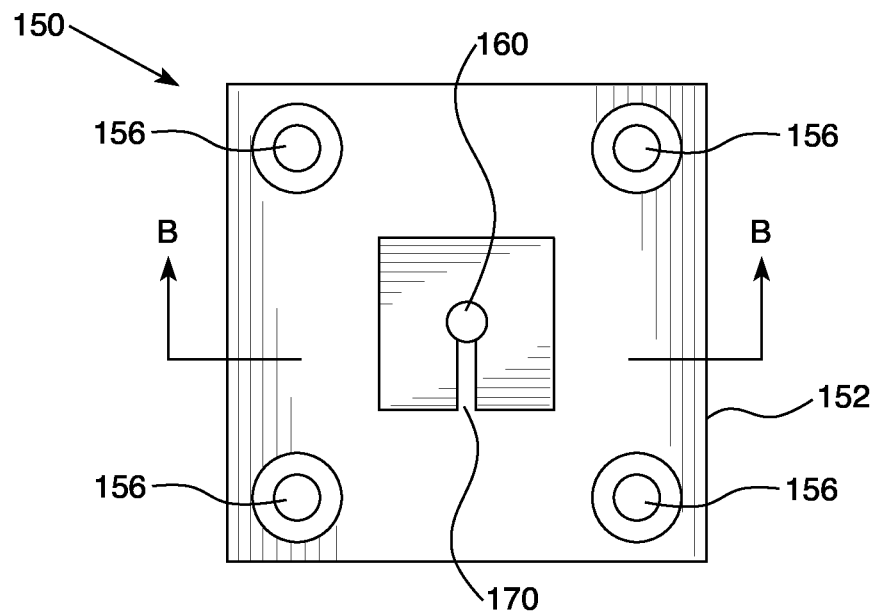
FIGS. 4A-4C are top plan, cross-sectional, and side plan views, respectively, of a droplet dispenser holder, in accordance with an embodiment of the present invention.
Figure 4B:
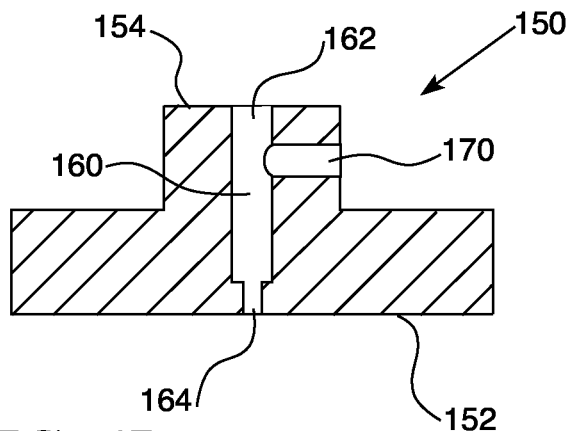
Figure 4C:
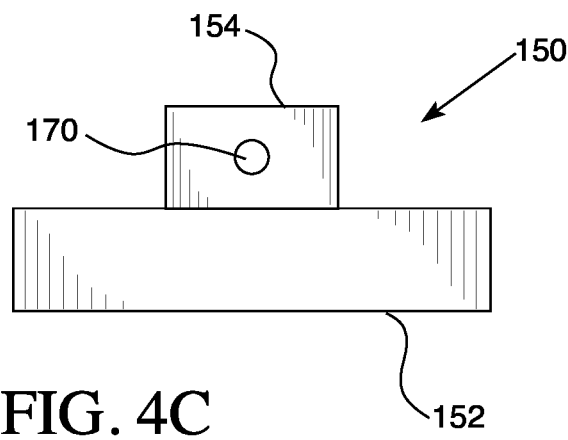

The dispenser holder 150 will be discussed in more detail with reference to FIGS. 4A-4C. The dispenser holder 150 includes a bottom surface 152 and a top surface 154. The bottom surface 152 is configured to be coupled to the top surface 116 of the chamber 110. For example, the bottom surface 152 of the dispenser holder 150 may include counterbores 156 for attaching the dispenser holder 150 to the chamber 110 with screws. One of ordinary skill in the art will readily understand that other attachment mechanisms are within the scope of this invention. For example, the dispenser holder 150 may be attached to the chamber 110 with glue, clamps, or the like.

The dispenser holder 150 further includes a through-hole 160 that is wide enough for droplets to pass through, but is not wide enough for the dispenser to pass through entirely. The upper portion 162 of the through hole 160 is wide enough to accommodate a distal tip of the droplet dispenser being positioned therein. The lower portion 164 of the through hole 160 has a reduced diameter to prevent the dispenser from being inserted too far. In other words, the top 162 of the through hole 160 has a larger diameter than the bottom 164 of the through hole 160. A slit in the dispenser holder 150 is for the wires to drive the droplet dispenser. A threaded hole 170 in communication with the through hole 160 is configured to accommodate a set screw in order to hold the dispenser in place when the tip of the dispenser is positioned in the top portion 162 of the through hole 160.

The dispenser holder 150 is made of a non-conducting material. For example, the droplet dispenser holder 150 may be made of an acetal plastic (such as DELRIN®) or any other non-conducting material that is sufficiently strong and rigid.

In accordance with an embodiment of the present invention, the droplet dispenser holder 150 safely holds and positions a droplet dispenser. The DBET dispenser holder 150 is configured to hold a droplet dispenser, which permits the generation of electrostatically charged droplets without potentially exposing the user to a high voltage electrode. The dispenser holder 150 does this by maintaining a proper distance between the droplet dispenser and an induction electrode that is situated between the droplet dispenser holder 150 and the chamber 110, thus preventing the dispenser from making contact with any electrodes. This protects users and equipment from being exposed to dangerous levels of high voltage. Although the dispenser holder 150 is depicted as being square shaped, the shape of the dispenser holder 150 may change depending on what it's placed on, including a circular shape. The width, the height, and the material used to make the droplet dispenser 150 may be altered. Additionally, different sized set screws may be used, and the number and size of counterbores may be changed without departing from the scope of the present invention.

Figure 5A:
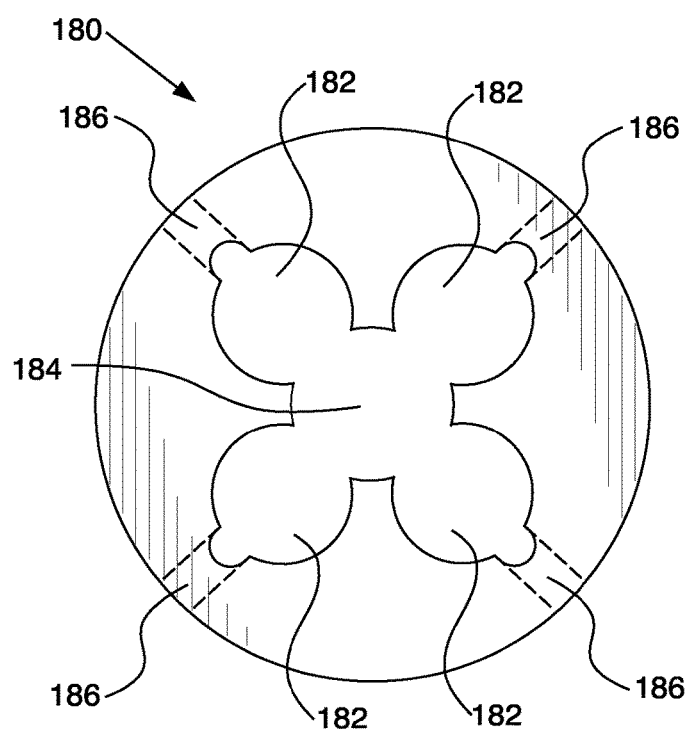
FIGS. 5A and 5B are top plan and side plan view, respectively, of a rod holder, in accordance with an embodiment of the present invention.
Figure 5B:
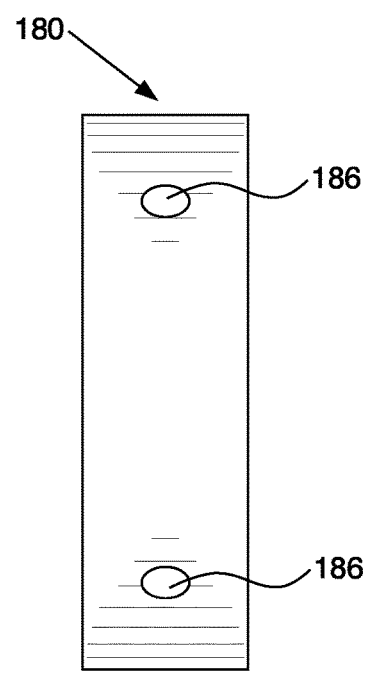

A rod holder 180 is depicted in FIGS. 5A and 5B. The rod holder 180 has four peripheral holes 182 to make a quadrupole with four metal rods. One metal rod is disposed in each one of the holes 182. The rod holder 180 is positioned perpendicularly relative to the longitudinal axis of the metal rods. The rod holder 180 further includes a central hole 184 that exposes levitated droplets to the high voltage applied to the metal rods, but maintains a lip where the rod holder 180 grips to the rods when a set screw is tightened to apply a force that holds the rods and rod holder 180 in place. As such, the rod holder 180 further includes a threaded opening 186 in communication with each one of the outer openings 182. The threaded openings 186 are sized and shaped to accommodate a set screw. There are four tapped holes 186, one for each rod. Additionally, there is a small diameter bore that allows wires to be connected to quadrupole rods.

The rod holder 180 is configured to ensure that four rods are properly positioned equidistant from each other in the enclosed chamber 110. The rod holder 180 properly positions quadrupole rods with the DBET 100. The rod holder 180 also serves as a counterbalance electrode holder and can be used to make electrical connections. The rod holder 180 can be positioned at any point along a quadrupole, allowing the DBET 100 to be modifiable. In other embodiments, a non-permanent sealant may be used to hold the rod holders 180 in place. A clamp may alternatively be used to provide enough force to hold the rod holder 180 in place. The size and shape of the rod holders 180 may change depending on the size of the rods and the shape of the chamber 110. The size of the set screw holes 186 may also be changed. In one embodiment, the rod holder 180 is made out of an acetal plastic (such as DELRIN®), but it can alternatively be made out of any non-conducting material.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for use in a dual balance electrode trap, the apparatus comprising:
   an outer chamber comprising a top surface, a bottom surface, at least one sidewall surface extending between the top surface and the bottom surface, at least one optical port in the sidewall surface, and a plurality of electrical feedthrough ports in the sidewall surface;

a droplet dispenser holder removably coupled to the top surface of the outer chamber, wherein the droplet dispenser holder comprises a top surface, a bottom surface, and a through hole that extends from the dispenser holder top surface to the droplet dispenser bottom surface, and wherein the through hole has a larger diameter portion adjacent to the droplet dispenser holder top surface and a smaller diameter portion adjacent to the droplet dispenser holder bottom surface; and a rod holder comprising a central opening and four peripheral openings that are sized and shaped to allow four respective quadrupole metal rods to pass therethrough, wherein the rod holder is configured to be removably coupled to the quadrupole metal rods so that a location of the rod holder relative to the metal rods is adjustable, and wherein the droplet dispenser holder further comprises a threaded opening in communication with the larger diameter portion of the through hole, wherein the threaded opening is sized and shaped to allow a set screw to pass therethrough in order to hold a distal end of a droplet dispenser in place relative to the droplet dispenser holder.

2. The apparatus of claim 1, wherein the outer chamber comprises four sidewall surfaces, each one of the sidewall surfaces having an optical port.

3. An apparatus for use in a dual balance electrode trap, the apparatus comprising:

an outer chamber comprising a top surface, a bottom surface, at least one sidewall surface extending between the top surface and the bottom surface, at least one optical port in the sidewall surface, and a plurality of electrical feedthrough ports in the sidewall surface;

a droplet dispenser holder removably coupled to the top surface of the outer chamber, wherein the droplet dispenser holder comprises a top surface, a bottom surface, and a through hole that extends from the dispenser holder top surface to the droplet dispenser bottom surface, and wherein the through hole has a larger diameter portion adjacent to the droplet dispenser holder top surface and a smaller diameter portion adjacent to the droplet dispenser holder bottom surface; and a rod holder comprising a central opening and four peripheral openings that are sized and shaped to allow four respective quadrupole metal rods to pass therethrough, wherein the rod holder is configured to be removably coupled to the quadrupole metal rods so that a location of the rod holder relative to the metal rods is adjustable, and wherein the rod holder further comprises four threaded openings, each one of the four threaded openings being in communication with a respective one of the four peripheral openings, and wherein the four threaded openings are sized and shaped to allow a set screw to pass therethrough in order to hold the four respective quadrupole metal rods in place relative to the rod holder.

4. An apparatus for use in a dual balance electrode trap, the apparatus comprising:

an outer chamber comprising a top surface, a bottom surface, at least one sidewall surface extending between the top surface and the bottom surface, at least one optical port in the sidewall surface, and a plurality of electrical feedthrough ports in the sidewall surface;

a droplet dispenser holder removably coupled to the top surface of the outer chamber, wherein the droplet dispenser holder comprises a top surface, a bottom surface, and a through hole that extends from the dispenser holder top surface to the droplet dispenser bottom surface, and wherein the through hole has a larger diameter portion adjacent to the droplet dispenser holder top surface and a smaller diameter portion adjacent to the droplet dispenser holder bottom surface; and a rod holder comprising a central opening and four peripheral openings that are sized and shaped to allow four respective quadrupole metal rods to pass therethrough, wherein the rod holder is configured to be removably coupled to the quadrupole metal rods so that a location of the rod holder relative to the metal rods is adjustable, and wherein the droplet dispenser holder is made of a non-conducting material.

5. The apparatus of claim 1, wherein the rod holder is made of a non-conducting material.

6. An apparatus for use in a dual balance electrode trap, the apparatus comprising:

an outer chamber comprising a top surface, a bottom surface, at least one sidewall surface extending between the top surface and the bottom surface, at least one optical port in the sidewall surface, and a plurality of electrical feedthrough ports in the sidewall surface;

a droplet dispenser holder removably coupled to the top surface of the outer chamber, wherein the droplet dispenser holder comprises a top surface, a bottom surface, and a through hole that extends from the dispenser holder top surface to the droplet dispenser bottom surface, and wherein the through hole has a larger diameter portion adjacent to the droplet dispenser holder top surface and a smaller diameter portion adjacent to the droplet dispenser holder bottom surface; and a plurality of rod holders, each one of the rod holders comprising a central opening and four peripheral openings that are sized and shaped to allow four respective quadrupole metal rods to pass therethrough, wherein the plurality of rod holders is configured to be removably coupled to the quadrupole metal rods at a respective plurality of locations along a length of the quadrupole metal rods so that locations of the rod holders relative to the metal rods is adjustable.

7. The apparatus of claim 1, wherein the at least one sidewall surface of the outer chamber comprises two gas flow ports that are smaller than the at least one optical port.

8. The apparatus of claim 1, wherein the at least one optical port comprises a transparent, airtight window for allowing a levitating droplet to be viewed from outside of the outer chamber.

9. The apparatus of claim 3, wherein the outer chamber comprises four sidewall surfaces, each one of the sidewall surfaces having an optical port.

10. The apparatus of claim 3, wherein the rod holder is made of a non-conducting material.

11. The apparatus of claim 3, wherein the at least one sidewall surface of the outer chamber comprises two gas flow ports that are smaller than the at least one optical port.

12. The apparatus of claim 3, wherein the at least one optical port comprises a transparent, airtight window for allowing a levitating droplet to be viewed from outside of the outer chamber.

13. The apparatus of claim 4, wherein the outer chamber comprises four sidewall surfaces, each one of the sidewall surfaces having an optical port.

14. The apparatus of claim 4, wherein the rod holder is made of a non-conducting material.

15. The apparatus of claim 4, wherein the at least one sidewall surface of the outer chamber comprises two gas flow ports that are smaller than the at least one optical port.

16. The apparatus of claim 4, wherein the at least one optical port comprises a transparent, airtight window for allowing a levitating droplet to be viewed from outside of the outer chamber.

17. The apparatus of claim 6, wherein the outer chamber comprises four sidewall surfaces, each one of the sidewall surfaces having an optical port.

18. The apparatus of claim 6, wherein each one of the rod holders is made of a non-conducting material.

19. The apparatus of claim 6, wherein the at least one sidewall surface of the outer chamber comprises two gas flow ports that are smaller than the at least one optical port.

20. The apparatus of claim 6, wherein the at least one optical port comprises a transparent, airtight window for allowing a levitating droplet to be viewed from outside of the outer chamber.

\* \* \* \* \*